(12) United States Patent
Ilg

(10) Patent No.: US 7,155,603 B2
(45) Date of Patent: Dec. 26, 2006

(54) CIRCUIT ARRANGEMENT FOR DETECTING THE STATE OF AT LEAST ONE ELECTRICAL SWITCH

(75) Inventor: Johannes Ilg, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 519 days.

(21) Appl. No.: 10/696,681

(22) Filed: Oct. 29, 2003

(65) Prior Publication Data
US 2005/0063504 A1 Mar. 24, 2005

(30) Foreign Application Priority Data
Oct. 29, 2002 (DE) .............................. 102 50 398

(51) Int. Cl.
*H01H 1/60* (2006.01)
(52) U.S. Cl. .................. 713/1; 307/125; 307/134; 307/137; 700/13; 375/373
(58) Field of Classification Search ............... 307/125, 307/137; 327/18, 20, 78, 81, 87
See application file for complete search history.

(56) References Cited

U.S. PATENT DOCUMENTS 5,729,167 A * 3/1998 Kujawa et al. ............ 327/137
6,469,545 B1 10/2002 Murr ............................. 327/20
6,535,136 B1 * 3/2003 Rodenbeck et al. ..... 340/686.6
6,600,242 B1 * 7/2003 Dennison .................... 307/125

FOREIGN PATENT DOCUMENTS

| DE | 683 429 C | 11/1939 |
| DE | 17 946 C | 12/1959 |
| DE | 199 17 819 A1 | 11/2000 |
| DE | 100 34 866 A1 | 2/2002 |
| EP | 1 209 477 A2 | 5/2002 |
| GB | 2 262 172 A | 6/1993 |
| GB | 2 351 618 A | 1/2001 |
| WO | 01/91149 | 11/2001 |

* cited by examiner

*Primary Examiner*—A. Elamin
(74) *Attorney, Agent, or Firm*—Baker Botts L.L.P.

(57) ABSTRACT

Circuit arrangement for detecting the state of at least one electrical switch having at least one set input (Set1, Set2, Set3) in each case and at least one sensor output (Sensor1, Sensor2, Sensor3) in each case, each of which is allocated to an electrical switch (S1, S2, S3), wherein the sensor output (Sensor1, Sensor2, Sensor3) is connected via a first current path to a first potential if a signal with the value logic "1" is present at the set input (Set1, Set2, Set3) and is connected via a second current path to a second potential if a signal with the value logic "0" is present at the set input (Set1, Set2, Set3), and wherein a wake-up signal is generated at a wake-up signal output (wakeup) if a current which is greater than a predetermined threshold current is detected in the first or second current path.

13 Claims, 2 Drawing Sheets

CIRCUIT ARRANGEMENT FOR DETECTING THE STATE OF AT LEAST ONE ELECTRICAL SWITCH

PRIORITY

This application claims foreign priority of the German application DE 10250398.2 filed on Oct. 29, 2002.

TECHNICAL FIELD

The invention relates to a circuit arrangement for detecting the state of at least one electrical switch, in particular for detecting an actuation of a plurality of switching elements in a motor vehicle.

BACKGROUND OF THE INVENTION

In modern motor vehicles, electrical loads such as, for example, the interior lighting or window lifter drives are controlled by a microprocessor as a function of the operated states of a plurality of switching elements such as, for example, door contact switches, boot lock switches, ignition lock switches, etc. The processor must therefore first detect the operated states of a plurality of switching elements and initiate the required action accordingly.

To avoid the microprocessor or associated microcontroller circuit arrangement continuously drawing a relatively high power, the microcontroller circuit or microprocessor is set to a standby or sleep mode during the periods in which the processor needs to perform no actions. From this mode, in which the circuit arrangement draws only a very low power, the microprocessor is switched, as required, i.e. on demand, or at predetermined time intervals, to the active mode by means of a wake-up signal.

With known circuit arrangements for detecting the state of at least one electrical actuating element, the relevant operated states are monitored by applying clocked voltage pulses via series resistors in each case to the individual switching elements, with a voltmeter being used to detect a voltage drop across the individual switching elements, said voltage drop reflecting the operated state of the respective switching element. For example, the electrical potential at the input of the voltmeter is connected to ground during switching of a switching element, whereas the electrical potential at the input of the voltmeter corresponds to the open switching elements of the supply voltage.

A disadvantage with this known circuit arrangement for detecting the state of at least one electrical switching element is the fact that an output signal reflecting the state of the switching elements is generated at the signal output even if none of the switching element is actuated and therefore also no output signal would be necessary. This known circuit arrangement is thus always in an active operating state during the clocked voltage pulses, which means that electrical energy is consumed unnecessarily.

A circuit arrangement for detecting operated states of switches for activating a motor vehicle electronics system is known from DE-A-199 17 819, wherein the circuit arrangement generates a wake-up signal if at least one switch is moved from a first defined operated state to a second defined operated state. The circuit arrangement is designed so that it generates the wake-up signal even during a transition from the second operated state to the first operated state. This is frequently necessary in automotive engineering because electrical switches in the active state are often closed. It is therefore necessary for both operated states to be clearly detectable.

SUMMARY OF THE INVENTION

Based on this prior art, the object of the invention is to provide a circuit arrangement for detecting the operated state of at least one electrical switch, whereby said circuit arrangement exhibits the lowest possible power consumption and can be implemented with the minimum outlay on circuit technology, with the operated states being detected with high reliability.

The object can be achieved by a circuit arrangement for detecting the state of at least one electrical switch comprising in each case a set input and a sensor output, each of which is assigned to a respective electrical switch, wherein the respective switch can connect the sensor output to a first potential via a first current path when a signal with the value logic "1" is present at the set input and can connect the sensor output via a second current path to a second potential when a signal with the value logic "0" is present at the set input, and wherein a wake-up signal is generated at a wake-up signal output if a current which is greater than a predetermined threshold current is detected in the first or second current path.

For each of the at least one electrical switches, a push-pull output stage can be provided whose input of which is connected directly or indirectly to the set input and whose output is connected directly or indirectly to the sensor output, wherein the output of the push-pull output stage is connected to the first potential if a signal with the value logic "1" is present at the set input and to the second potential if a signal with the value logic "0" is present at the set input. A resistor can be provided in each case in a first and second current path, the voltage drop of said resistor being used in each case to generate the wake-up signal in the event of a current flow. The resistors each may lie in current paths commonly used for a plurality of push-pull output stages. The at least one sensor output for use with a 2-pole electrical switch, the other switch contact of which is connected to the first or second potential, can be connected via a resistor to the respective other potential preferably via an additional controllable switch.

The object can further be achieved by a microcontroller circuit arrangement comprising:

a circuit arrangement for detecting the state of at least one electrical switch comprising:
  a) in each case a set input and a sensor output, each of which is assigned to a respective electrical switch,
  b) wherein the respective switch can connect the sensor output to a first potential via a first current path when a signal with the value logic "1" is present at the set input and can connect the sensor output via a second current path to a second potential when a signal with the value logic "0" is present at the set input, and
  c) wherein a wake-up signal is generated at a wake-up signal output if a current which is greater than a predetermined threshold current is detected in the first or second current path, wherein a digital control output of the microcontroller is connected in each case to a set input of the state-detection circuit arrangement, wherein the wake-up signal output of the circuit arrangement is connected to the wake-up signal input of the microcontroller, and wherein the microcontroller determines the switch setting or the change to the switch setting of the at least one switch from the states of the digital control outputs and the state of the wake-up signal, and if necessary triggers dependent actions as required as a function of the switch setting or the change to the switch setting.

After receiving a wake-up signal, the microcontroller can set the states of one or more digital control outputs such that no wake-up signal is supplied to it by the state-detection circuit arrangement. The microcontroller may determine the switch setting or the change to the switch setting of the at least one switch solely from the states of the digital control outputs. The microcontroller may have a hardware counter unit or a counter unit simulated by software, wherein the counter outputs are connected to the set inputs (Set1, Set2, Set3) of the state-detection circuit arrangement, and wherein the counting process of the counter unit is started by the active wake-up signal supplied to the counter unit and stopped by the inactive wake-up signal supplied to the counter unit.

The object can also be achieved by method for detecting the state of at least one electrical switch comprising the steps of:

a) providing a set input and a sensor output for each electrical switch,
b) connecting the sensor output to a first potential via a first current path when a signal with the value logic "1" is present at the set input, or
c) connecting the sensor output via a second current path to a second potential when a signal with the value logic "0" is present at the set input, and
d) generating a wake-up signal at a wake-up signal output if a current which is greater than a predetermined threshold current is detected in the first or second current path.

Steps b) and/or c) may comprise the steps of connecting the input of a push-pull output stage directly or indirectly to the set input and connecting the output of the push-pull output stage directly or indirectly to the sensor output, wherein the output of the push-pull output stage is connected to the first potential if a signal with the value logic "1" is present at the set input and to the second potential if a signal with the value logic "0" is present at the set input. The method may further comprise the step of providing a resistor in each case in a first and second current path, the voltage drop of said resistor being used in each case to generate the wake-up signal in the event of a current flow. The resistors can each lie in current paths commonly used for a plurality of push-pull output stages. The method may further comprise the step of connecting the at least one sensor output for use with a 2-pole electrical switch, the other switch contact of which is connected to the first or second potential, via a resistor to the respective other potential. The step of connecting the at least one sensor output can be performed via an additional controllable switch.

The invention is based on the knowledge that two different potentials can be applied to a switch to be monitored via an output of the circuit arrangement for detecting the operated state of at least one electrical switch. The other contact(s) of the switch in each case is (are) also connected to the one or other potential. With a closed switch, a current therefore flows in a current path in which the output of the circuit arrangement lies. This current flow is detected by means of a current detector unit, with the circuit arrangement generating a wake-up signal if the detected current exceeds a certain threshold current.

The current detector unit can, for example, be realized by means of a load resistor in the relevant current path, with the voltage drop at this load resistor being used to switch a controllable electronic switch, for example a transistor.

After a wake-up signal is received, the microcontroller controls the state-detection circuit arrangement so that no current then flows in the relevant current path for the given operated position of the switch. This is achieved by applying the other potential in each case to the output of the state-detection circuit arrangement. Depending on the detected operated state, the microcontroller can then trigger the required action and subsequently return to the sleep mode.

According to an embodiment of the invention, for each electrical switch whose status is to be monitored, a push-pull output stage is provided whose input is directly or indirectly connected to the set input of the state-detection circuit arrangement controllable by the microcontroller, with the output of the push-pull output stage being connected to the first potential when a High signal is applied to the set input, and to the second potential when a Low signal is applied to the set input.

In this way, a potential can easily be applied in each case to the relevant contact of the switch to be monitored in a manner that is controllable by the microcontroller.

Whereas a separate push-pull output stage is necessary for each switch to be monitored, a common current detector unit can be provided for several or all switches. This substantially reduces the circuitry-related overhead. In this case the microcontroller can change the set inputs of the state-detection circuit arrangement until a state is achieved in which no wake-up signal is generated. In this state, it is guaranteed that no current which would of course lead to a wake-up signal flows through any of the push-pull output stages. This therefore guarantees a minimum power consumption by the push-pull output stages in the idle state.

The states of the set inputs can be changed by the microcontroller according to a predetermined strategy. For example, starting from the state of the set inputs before a wake-up signal, the state of only one set input is always changed in each case. This is done assuming that frequently only one of the switches to be monitored is actuated. If a wake-up signal is still generated after the state of in each case only one set input is changed, the switch can proceed to change the states of in each case two set inputs, and so on.

According to a different, simpler strategy, the controller can, however, also operate the digital outputs which are connected to the set inputs of the state-detection circuit arrangement as a counter and increment or decrement the counter according to a predetermined clock signal (or also asynchronously) until the wake-up signal disappears.

Instead of a counter realized by software in the microcontroller and a corresponding control of digital outputs, a hardware counter can also be provided that starts a counting process (upward or downward) according to a predetermined clock signal upon receipt of a wake-up signal. The counting process can take place from any state or else from the state that the outputs of the counters are in before receipt of a wake-up signal.

If a current-detector unit is provided in the relevant current paths of each push-pull output stage, a wake-up signal can be generated for each individual switch to be monitored. In this case, the microcontroller directly receives the information regarding the allocation of the relevant wake-up signal to the switch to be monitored.

BRIEF DESCRIPTION OF THE DRAWINGS

The invention is explained in more detail below with reference to the figures shown in the drawing.

DETAILED DESCRIPTION OF THE PREFERRED EMBODIMENTS

Figure 1:
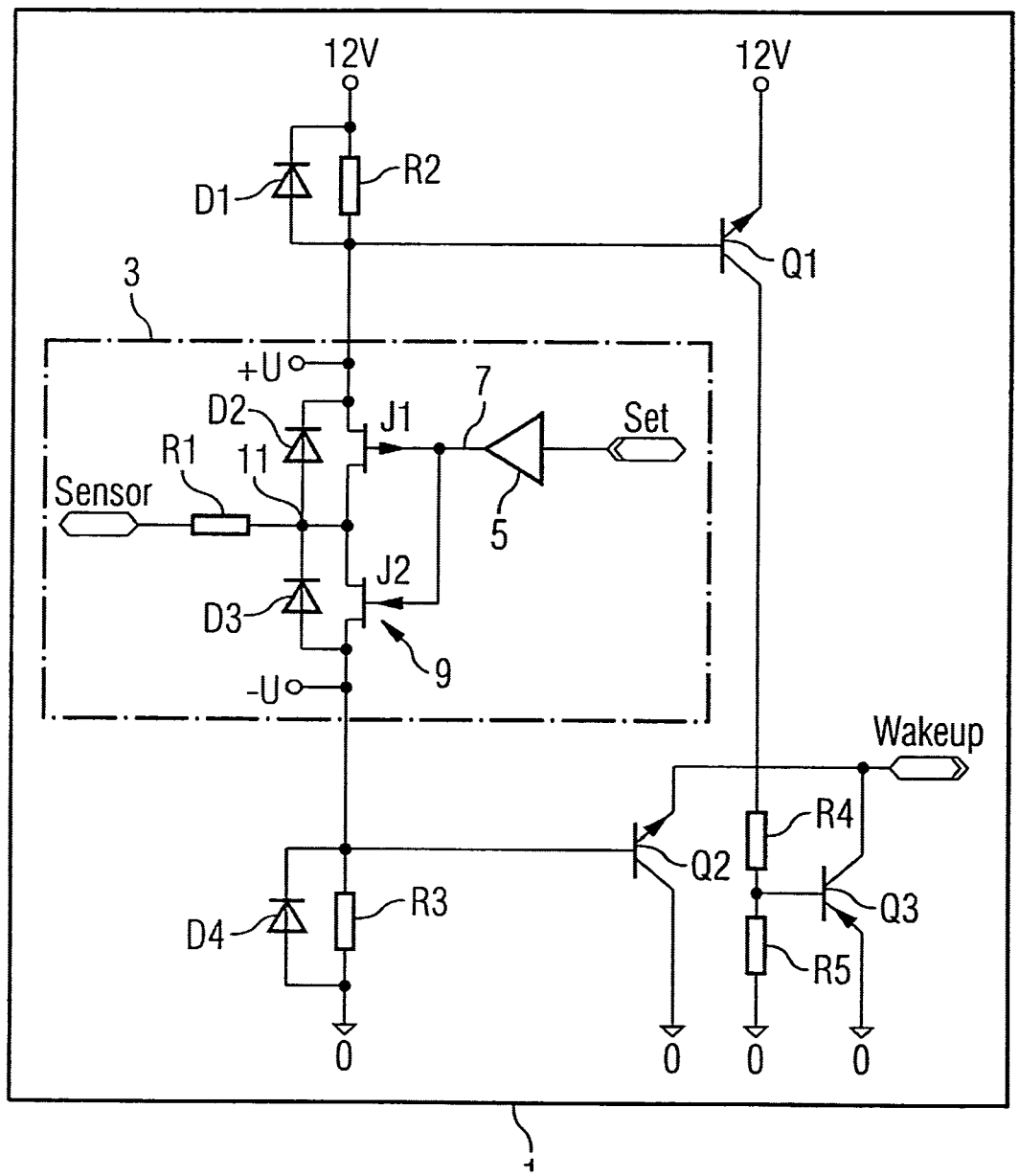
FIG. 1 A circuit diagram of an embodiment of the circuit arrangement according to the invention for detecting the state of at least one electrical switch.

The circuit arrangement 1 as shown in FIG. 1 for detecting the state of at least one electrical switch has, for each of the electrical switches to be monitored, a unit 3 having a set input to which a digital signal can be supplied. The set input is connected to an input of an amplifier 5, the output of which is connected to an input 7 of a push-pull output stage 9. The amplifier 5 is used to match the voltage level of the control signal present at the set input to the operating voltage level of the push-pull output stage 9. If no level matching at all is necessary, the amplifier 5 can, of course, be omitted.

The push-pull output stage consists of the complementary transistors J1 and J2. The output 11 of the push-pull output stage 9 is connected via a resistor R1 to a sensor output of the unit 3. In addition, the push-pull output stage 9 has protective diodes D2 and D3.

The free electrode of transistor J1 is connected via a parallel circuit of a resistor R2 and of a protective diode D1 to the potential of the operating voltage (12 V in the exemplary embodiment shown). The voltage drop at resistor R2 is supplied to the base of a switching transistor Q1, the emitter of which also has the operating voltage applied to it. A voltage divider consisting of the resistors R4 and R5 is provided in the collector branch of transistor Q1. The voltage drop at resistor R5 is used to control the base of a further switching transistor Q3 that conducts as a function of the voltage drop occurring at resistor R5 and in the conducting state generates an active wake-up signal at its collector. In the case of an active wake-up signal, the switching transistor Q3 is thus in the conducting state, so that a (positive) potential present at the wake-up output in a non-conducting state is switched to ground. With the embodiment shown in FIG. 1, an active-low wake-up signal is thus generated.

The free electrode of transistor J2 of the push-pull output stage 9 is also connected via a parallel circuit of a protective diode 4 and a resistor R3 with the ground potential. A voltage drop possibly occurring at resistor R3 is supplied to the base of a switching transistor Q2. The collector of this switching transistor Q2 is in turn connected to the wake-up output of the state-detection circuit arrangement 1.

If transistor Q2 switches to the conducting state if a voltage drop of sufficient magnitude occurs at resistor R3, an active-low wake-up signal is also generated.

In order to monitor a plurality of electrical switches, all that is necessary is to supplement the state-detection circuit arrangement 1 shown in FIG. 1 with further units 3, with the free electrodes of the transistors of the push-pull output stages 9 being connected together.

Figure 2:
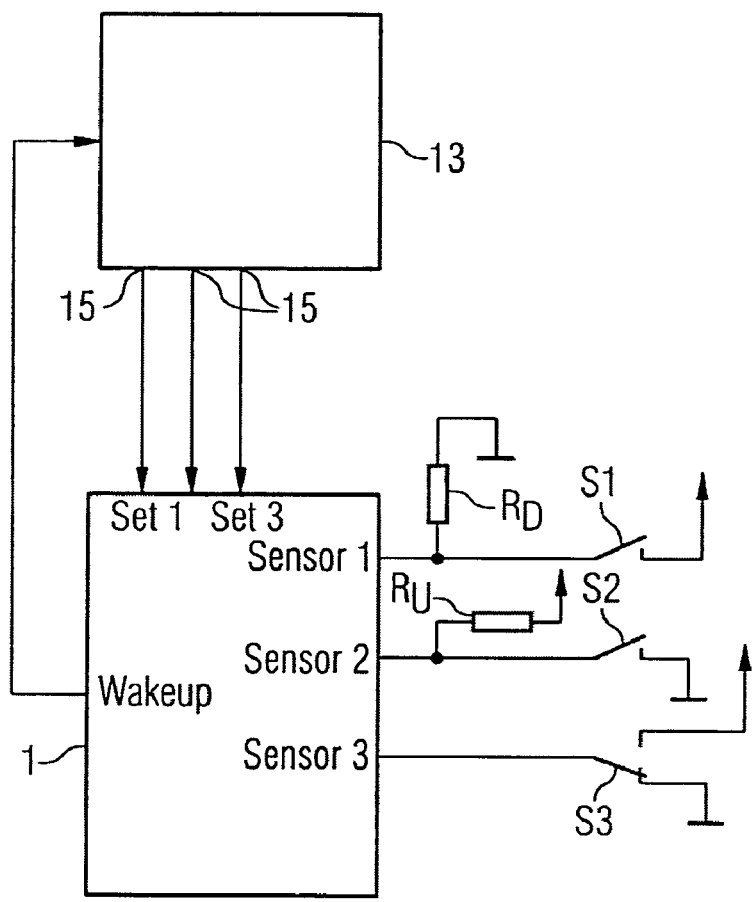
FIG. 2 A schematic block diagram of a microcontroller circuit arrangement with a state-detection circuit arrangement according to the invention, for monitoring three electrical switches.

A complete microcontroller circuit arrangement for detecting the state of multiple (three in the exemplary embodiment shown) electrical switches is schematically shown in FIG. 2. The microcontroller 13 is connected via a digital control output 15 in each case with a set input Set1, Set2, Set3 of the state-detection circuit arrangement 1. The state-detection circuit arrangement 1 shown schematically in FIG. 2 can be designed the same as that shown in FIG. 1. In this case, however, three units 3 connected in parallel are of course necessary.

Each of the sensor outputs Sensor1, Sensor2, Sensor3 is connected to a switch contact of one of three switches S1, S2, S3. To explain the different embodiments or different operating principles of the microcontroller circuit arrangement, an embodiment was chosen for switch S1 whereby sensor output Sensor1 can be switched to ground as required, whereas sensor output Sensor2 can be switched to ground by means of switch S2 as required, and sensor output Sensor3 can be switched by switch S3 as required to the operating voltage or ground potential.

To be able to easily detect the open state of switch S1 or S2 by means of the state-detection circuit arrangement, the sensor output Sensor1 is connected to ground by means of a resistor $R_D$ and the output Sensor2 is connected to the operating voltage by means of a resistor $R_U$.

In this way it is ensured that a defined potential is present even with an open switch at the output Sensor1 or Sensor2.

Figure 3:
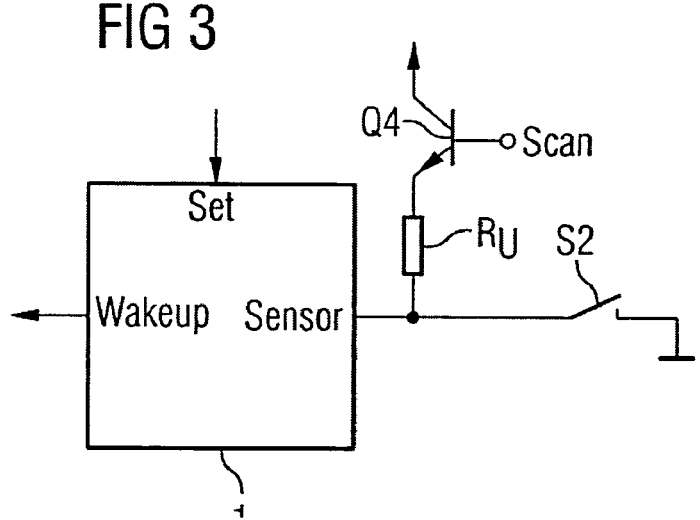
FIG. 3 A schematic block diagram of a further embodiment of a state-detection circuit arrangement for monitoring a switch with a switch contact that switches to ground.

To avoid a continuous relatively high power consumption due to this when switch S1 or S2 is closed, resistors $R_D$ or $R_u$ can of course be connected to the relevant potential by means of a controllable electrical switch. FIG. 3 is a schematic showing a case where a sensor output which is used to monitor a switch that switches to ground is connected to the operating voltage via a resistor $R_u$ and a switching transistor Q4. Of course, a switch that switches to the operating voltage can similarly be connected to ground by switching in a resistor $R_D$ and a switching transistor. The switching transistor Q4 must in these cases be conducting at least during the period when the state of the relevant switch to be monitored is to be detected. The switching transistor Q4 can also, of course, be controlled via the microcontroller 13.

A more detailed description of the operating principle of the microcontroller circuit arrangement shown in FIG. 2 is given in the following. This description assumes that the state-detection circuit arrangement 1 is designed according to the form shown in FIG. 1, but with a total of 3 units being provided.

Because either ground potential or the potential of the operating voltage of the microcontroller 13 is present at the set inputs Set1 to Set3 of the circuit arrangement 1, a transistor J1 or J2 of the push-pull output stages 9 is necessarily switched after the operating voltage of the microcontroller is matched to the operating voltage of the circuit arrangement 1. Therefore, each of the outputs Sensor1 to Sensor3 of units 3 is connected through the relevant resistor R1 and the common resistor R2, or in each case through resistor RI and a common resistor R3, to the operating voltage or to ground. Depending on the setting of switches S1 to S3, that potential that results as a function of the setting of the switches is necessarily present at the relevant output Sensor1 to Sensor3.

The state of switch S1 can be determined by the microcontroller 13 as follows:

It is assumed as a starting situation that switch S1 is in the open state. If the potential of the microcontroller operating voltage is present at input Set1, transistor J1 conducts, while transistor J2 of the push-pull output stage 9 blocks. Because the output Sensor1 is connected to ground via resistor $R_D$, a current flows via resistor R2, resistor R1 and resistor $R_D$. Because of the voltage drop at R2, transistor Q1 conducts and therefore a voltage drop of sufficient magnitude for transistor Q3 to conduct occurs at resistor R5 of the voltage divider located in the collector branch of transistor Q1.

Consequently, an active-low wake-up signal is generated at the wake-up output. This wake-up signal causes the microcontroller 13 to "wake up", whereupon this microcontroller attempts according to the invention to switch the control outputs Set1 to Set3 so that no further wake-up signal occurs. If microcontroller 13 accordingly switches the relevant output 15 so that ground potential is present at input Set1 of the circuit arrangement 1, transistor J2 of the push-pull output stage 9 now conducts. Therefore, the output Sensor1 is connected to ground via resistor R1, transistor J2 and resistor R3. This means that no current flows in this current path and therefore no voltage drop occurs at resistor R3 to make transistor Q2 conduct and generate a wake-up signal. The wake-up signal in this case has the value logic "0". This naturally assumes that switches S2 and S3 are in such states that no partial current through resistor R2 or R3 results in conjunction with the control signals present at inputs Set2 and Set3, and consequently a wake-up signal is not generated by this.

If the setting of switch S1 is now changed to the closed state, a positive potential corresponding to the operating voltage is produced at output Sensor1. Due to the ground potential still present at set input Set1 and the fact that transistor J2 of the push-pull output stage 9 is therefore conducting, a current flow results via resistor R1 and resistor R3. The corresponding voltage drop at resistor R3 causes transistor Q2 to conduct and a wake-up signal with the logic state "1" is generated.

This can cause the microcontroller to again be awakened from its inactive state which it assumed after it changed the control signal output at the relevant control output 15 the last time such that no wake-up signal is generated (due to the state of switch S1 and the relevant control signal at input Set1).

In this state, the microcontroller 13 will now again attempt to control input Set1 of the circuit arrangement 1 so that no wake-up signal is generated in conjunction with the state of switch S1. The microcontroller 13 will therefore apply the operating voltage at input Set1 and this again causes transistor J1 to conduct. As switch S1 is still closed, no current at all flows through resistor R1, transistor J1 or resistor R2, since the potential of the operating voltage is present at output Sensor1. Consequently, the wake-up signal will assume the value logic "0".

If this operating principle is shown in the form of a table, we get the following.

| Switch state | Set1 | Wake-up |
|---|---|---|
| 0 | 1 | 1 |
| 0 | 0 | 0 |
| 1 | 0 | 1 |
| 1 | 1 | 0 |

In this case, the closed state of switch S1 is designated as logic "1" and the open state as logic "0". Ground potential present at the set input is designated as logic "0" in this table and the potential of the operating voltage as logic "1".

A further assumption in this table is that due to signals Set2, Set3 and the states of switches S2 and S3, no current flow whatsoever is generated though resistors R2 and R3 either, so that this also does not cause a wake-up signal with the value logic "1" to be generated.

The state of switch S2 which switches output Sensor2 to ground is detected in a similar manner. The following table results for the operating principle of switch S2:

| Switch state | Set1 | Wake-up |
|---|---|---|
| 0 | 1 | 0 |
| 1 | 1 | 1 |
| 1 | 0 | 0 |
| 0 | 0 | 1 |

This table also assumed that switches S1, S3 and the signals at inputs Set1, Set3 also have such values that no current flow results via resistors R2 or R3.

In a similar manner, the following table results for switch S3 and the signal at input Set3.

| Switch state | Set1 | Wake-up |
|---|---|---|
| 1 | 1 | 0 |
| 0 | 1 | 1 |
| 0 | 0 | 0 |
| 1 | 0 | 1 |

An assumption in this case is that the settings of switches S1, S2 and the control signals at inputs Set1, Set2 do not result in a voltage drop at resistors R2 or R3 which would lead to the generation of a wake-up signal with the value logic "1".

From the state of the control signal present at the relevant control output 15 or input Set1 to Set3, and from the value of the wake-up signal, the microcontroller can therefore determine the state of the individual switches on the basis of the state tables shown here. If, however, as was assumed above, several units 3 are connected in parallel and the wake-up signal is generated via common resistors R2 or R3, the state logic "1" for the wake-up signal is ambiguous. An unambiguous state does, however, result due to the procedure whereby the microcontroller continues to vary the control outputs 15 until no wake-up signal occurs. Assuming a wake-up signal with the state logic "0" and knowledge of the associated signal present at the particular set input, the microcontroller 13 can determine the state of the relevant switch S1 to S3 from the above tables. In addition, the microcontroller 13 must, of course, also have information regarding the "type" of switch concerned, i.e. whether it is a changeover switch, a switch that switches to ground or a switch that switches to operating voltage potential.

In practice there is a simple way to change the signals present at the set inputs in such a way that a wake-up signal with the value logic "0" is generated in that, starting from the status quo only one signal is changed in each case and a check is carried out to determine whether as a result of this action the next wake-up signal assuming the value logic "1" switches to the value logic "0". If this action does not lead to success, in the next step two signals, starting from the status quo, can be changed in each case. By this means, a very fast detection of the switch states is normally guaranteed, because the probability that an increasingly large number of switches have changed their state simultaneously, constantly reduces.

A further approach consists in the microcontroller 13 operating the control inputs 15 like a counter and increments the relevant digital number by only 1 in each case. In this case the status quo can again also serve as the starting state for the counter.

A hardware counter can, of course, also be provided in place of a software counter of this kind. The wake-up signal is supplied to this hardware counter as an enable signal. If the wake-up signal assumes a value logic "1", the counting process is enabled. The counter is stopped when the wake-up signal assumes a value of logic "0". The microcontroller can then read the counter tally and from this determine the signals present at inputs Set1 to Set3.

The process for determining the state of the switches can be triggered either by the presence of a wake-up signal with the value logic "1" or automatically by the microcontroller 13 or by an external signal. After detection of the switch states, the microcontroller can, as already explained above, carry out appropriate actions and then independently revert to the active state.

I claim:

1. A circuit arrangement for detecting the state of at least one electrical switch comprising:
    a) in each case a set input and a sensor output, each of which is assigned to a respective electrical switch,
    b) wherein the respective switch can connect the sensor output to a first potential via a first current path when a signal with the value logic "1" is present at the set input and can connect the sensor output via a second current path to a second potential when a signal with the value logic "0" is present at the set input, and
    c) wherein a wake-up signal is generated at a wake-up signal output if a current which is greater than a predetermined threshold current is detected in the first or second current path, wherein for each of the at least one electrical switches, a push-pull output stage is provided whose input of which is connected directly or indirectly to the set input and whose output is connected directly or indirectly to the sensor output, wherein the output of the push-pull output stage is connected to the first potential if a signal with the value logic "1" is present at the set input and to the second potential if a signal with the value logic "0" is present at the set input.

2. The circuit arrangement according to claim 1, wherein a resistor is provided in each case in a first and second current path, the voltage drop of said resistor being used in each case to generate the wake-up signal in the event of a current flow.

3. The circuit arrangement according to claim 1, wherein resistors each lie in current paths commonly used for a plurality of push-pull output stages.

4. A circuit arrangement for detecting the state of at least one electrical switch comprising:
    a) in each case a set input and a sensor output, each of which is assigned to a respective electrical switch,
    b) wherein the respective switch can connect the sensor output to a first potential via a first current path when a signal with the value logic "1" is present at the set input and can connect the sensor output via a second current path to a second potential when a signal with the value logic "0" is present at the set input, and
    c) wherein a wake-up signal is generated at a wake-up signal output if a current which is greater than a predetermined threshold current is detected in the first or second current path, wherein the at least one sensor output for use with a 2-pole electrical switch, the other switch contact of which is connected to the first or second potential, is connected via a resistor to the respective other potential.

5. A microcontroller circuit arrangement comprising:
    a circuit arrangement for detecting the state of at least one electrical switch comprising:
        a) in each case a set input and a sensor output, each of which is assigned to a respective electrical switch,
        b) wherein the respective switch can connect the sensor output to a first potential via a first current path when a signal with the value logic "1" is present at the set input and can connect the sensor output via a second current path to a second potential when a signal with the value logic "0" is present at the set input, and
        c) wherein a wake-up signal is generated at a wake-up signal output if a current which is greater than a predetermined threshold current is detected in the first or second current path,
    wherein a digital control output of the microcontroller is connected in each case to a set input of the state-detection circuit arrangement,
    wherein the wake-up signal output of the circuit arrangement is connected to the wake-up signal input of the microcontroller, and
    wherein the microcontroller determines the switch setting or the change to the switch setting of the at least one switch from the states of the digital control outputs and the state of the wake-up signal, and if necessary triggers dependent actions as required as a function of the switch setting or the change to the switch setting, wherein after receiving a wake-up signal, the microcontroller sets the states of one or more digital control outputs such that no wake-up signal is supplied to it by the state-detection circuit arrangement.

6. The microcontroller circuit arrangement according to claim 5, wherein the microcontroller determines the switch setting or the change to the switch setting of the at least one switch solely from the states of the digital control outputs.

7. The microcontroller circuit arrangement according to claim 5, wherein the microcontroller has a hardware counter unit or a counter unit simulated by software, wherein the counter outputs are connected to the set inputs of the state-detection circuit arrangement, and wherein the counting process of the counter unit is started by the active wake-up signal supplied to the counter unit and stopped by the inactive wake-up signal supplied to the counter unit.

8. A method for detecting the state of at least one electrical switch comprising the steps of:
    a) providing a set input and a sensor output for each electrical switch,
    b) connecting the sensor output to a first potential via a first current path when a signal with the value logic "1" is present at the set input, or
    c) connecting the sensor output via a second current path to a second potential when a signal with the value logic "0" is present at the set input, and
    d) generating a wake-up signal at a wake-up signal output if a current which is greater than a predetermined threshold current is detected in the first or second current path,
    wherein steps b) and/or c) comprise the steps of:
        connecting the input of a push-pull output stage directly or indirectly to the set input and connecting the output of the push-pull output stage directly or indirectly to the sensor output, wherein the output of the push-pull output stage is connected to the first potential if a signal with the value logic "1" is present at the set input and to the second potential if a signal with the value logic "0" is present at the set input.

9. The method according to claim 8, further comprising the step of providing a resistor in each case in a first and second current path, the voltage drop of said resistor being used in each case to generate the wake-up signal in the event of a current flow.

10. The method according to claim 9, wherein the resistors each lie in current paths commonly used for a plurality of push-pull output stages.

11. A method for detecting the state of at least one electrical switch comprising the steps of:
   a) providing a set input and a sensor output for each electrical switch,
   b) connecting the sensor output to a first potential via a first current path when a signal with the value logic "1" is present at the set input, or
   c) connecting the sensor output via a second current path to a second potential when a signal with the value logic "0" is present at the set input, and
   d) generating a wake-up signal at a wake-up signal output if a current which is greater than a predetermined threshold current is detected in the first or second current path, further comprising the step of connecting the at least one sensor output for use with a 2-pole electrical switch, the other switch contact of which is connected to the first or second potential, via a resistor to the respective other potential.

12. The method according to claim 11, wherein the step of connecting the at least one sensor output is performed via an additional controllable switch.

13. The circuit arrangement according to claim 4, wherein the at least one sensor output for use with a 2-pole electrical switch is connected via an additional controllable switch to the respective other potential.

* * * * *